United States Patent [19]

Luger

[11] Patent Number: 5,048,858

[45] Date of Patent: Sep. 17, 1991

[54] WHEEL SUSPENSION SYSTEM FOR THE FRONT WHEELS OF A MOTOR VEHICLE

[75] Inventor: Martin Luger, Niefern, Fed. Rep. of Germany

[73] Assignee: Dr. Ing. h.c.F. Porsche Ag, Fed. Rep. of Germany

[21] Appl. No.: 486,949

[22] Filed: Mar. 1, 1990

[30] Foreign Application Priority Data

Mar. 25, 1989 [DE] Fed. Rep. of Germany ....... 3909942

[51] Int. Cl.$^5$ ............................................... B60G 3/20
[52] U.S. Cl. ..................................... 280/660; 280/668
[58] Field of Search ............... 280/696, 701, 667, 692, 280/661, 675, 689, 772, 660, 668

[56] References Cited

U.S. PATENT DOCUMENTS

| 3,193,304 | 7/1965 | Beblhe | 280/692 |
| 4,436,175 | 3/1984 | Watanabe et al. | 280/660 |
| 4,671,531 | 6/1987 | Sautter | 280/688 |
| 4,705,292 | 11/1987 | Hesplet et al. | 280/660 |
| 4,786,075 | 11/1988 | Takahashi | 280/696 |
| 4,854,603 | 8/1989 | Scaduto | 280/112.1 |

FOREIGN PATENT DOCUMENTS

| 3442682 | 3/1987 | Fed. Rep. of Germany . |
| 1083291 | 1/1955 | France . |
| 2207646 | 2/1989 | United Kingdom . |

Primary Examiner—Richard A. Bertsch
Attorney, Agent, or Firm—Evenson, Wands, Edwards, Lenahan & McKeown

[57] ABSTRACT

A wheel suspension for a wheel carrier of the front wheels of a motor vehicle is pivotally connected to an upper and a lower transverse link as well as a spring-and-damper element which is connected with either the upper or lower transverse link and is supported at the vehicle body. The spring-and-damper element is supported in a bearing on a bearing lever located between the upper and the lower transverse link. This bearing lever is pivotally attached to one of the transverse links and during suspension movements is guided by way of a control lever pivotally attached to the vehicle body. By means of the variable arrangement of the lower support point of the spring-and-damper element, an arrangement is achieved which is advantageous with respect to space while optimizing the damper transmission ratio is good.

21 Claims, 4 Drawing Sheets

WHEEL SUSPENSION SYSTEM FOR THE FRONT WHEELS OF A MOTOR VEHICLE

BACKGROUND AND SUMMARY OF THE INVENTION

The invention relates to a wheel suspension system for the front wheels of a motor vehicle having an upper and a lower transverse link pivotally connected to a wheel carrier of the front wheel and having a spring-and-damper element which is connected with either the upper or the lower transverse link and is supported at the vehicle body.

A spring-and-damper element for a front wheel suspension has the purpose of ensuring a good damper transmission ratio as well as having a support point that is desirably and advantageously located in the suspension arrangement.

DE-PS 34 42 682 shows a wheel suspension where a spring-and-damper element is supported directly at the lower transverse link. The support point is disposed in the plane of the transverse link and can be changed on it, in which case, a change of position with respect to height is not provided.

It is an object of the invention to provide a front wheel suspension in which a support point on the transverse link side is to be arranged largely independently of the level of the transverse link.

According to the invention, this object is achieved by having the spring-and-damper element supported between the upper and the lower transverse link by a bearing on a bearing lever which is pivoted to the transverse link and is guided by way of a control lever disposed on a side of the vehicle body.

It is advantageous if the bearing lever is pivoted around an axis disposed adjacent to the wheel carrier and a joint connecting the transverse link to the wheel carrier. The bearing lever should be on an inclined acute angle with respect to a longitudinal horizontal plane extending through the link. The bearing lever comprises arms reaching around the transverse link on both sides to support the spring-and-damper unit approximately at the perpendicular wheel center transverse plane of the bearing.

It is also advantageous to have a suspension gear for a stabilizer pivotally held on a pin holding the bearing between the arms of the bearing lever.

A principal advantage achieved by the invention is that the lower support point of the spring-and-damper element may be displaced to a point which ensures a favorable arrangement of the spring-and-damper element with respect to space.

Thus, a first embodiment provides a pivotal connection to the upper transverse link by way of a bearing lever, and a second embodiment provides a pivotal connection to the lower transverse link. As a result, a lower support point may be provided between the two transverse links which, for reasons of space, is more advantageous than for the support point to be provided at the lower transverse link, since that would require the spring-and-damper element to be guided past the drive shaft which results in additional expenditures. A direct support at the upper transverse link is disadvantageous because it results in an unfavorable damper transmission ratio. As a result of the arrangement, which is free within limits (of the lower support point of the spring-and-damper element and of the length of the bearing lever or of the control lever which necessarily guides the lower support point within the radius around its bearing on the vehicle body side) the speed or the path of the support point and thus the actuating of the spring strut is controlled correspondingly during springing operations. That is, when the support point is displaced toward the longitudinal center plane of the vehicle, the covered path of the support point is shorter than in the case of a shifting of the support point in the direction to the wheel side. This results in a longer path of the support point during springing operations of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
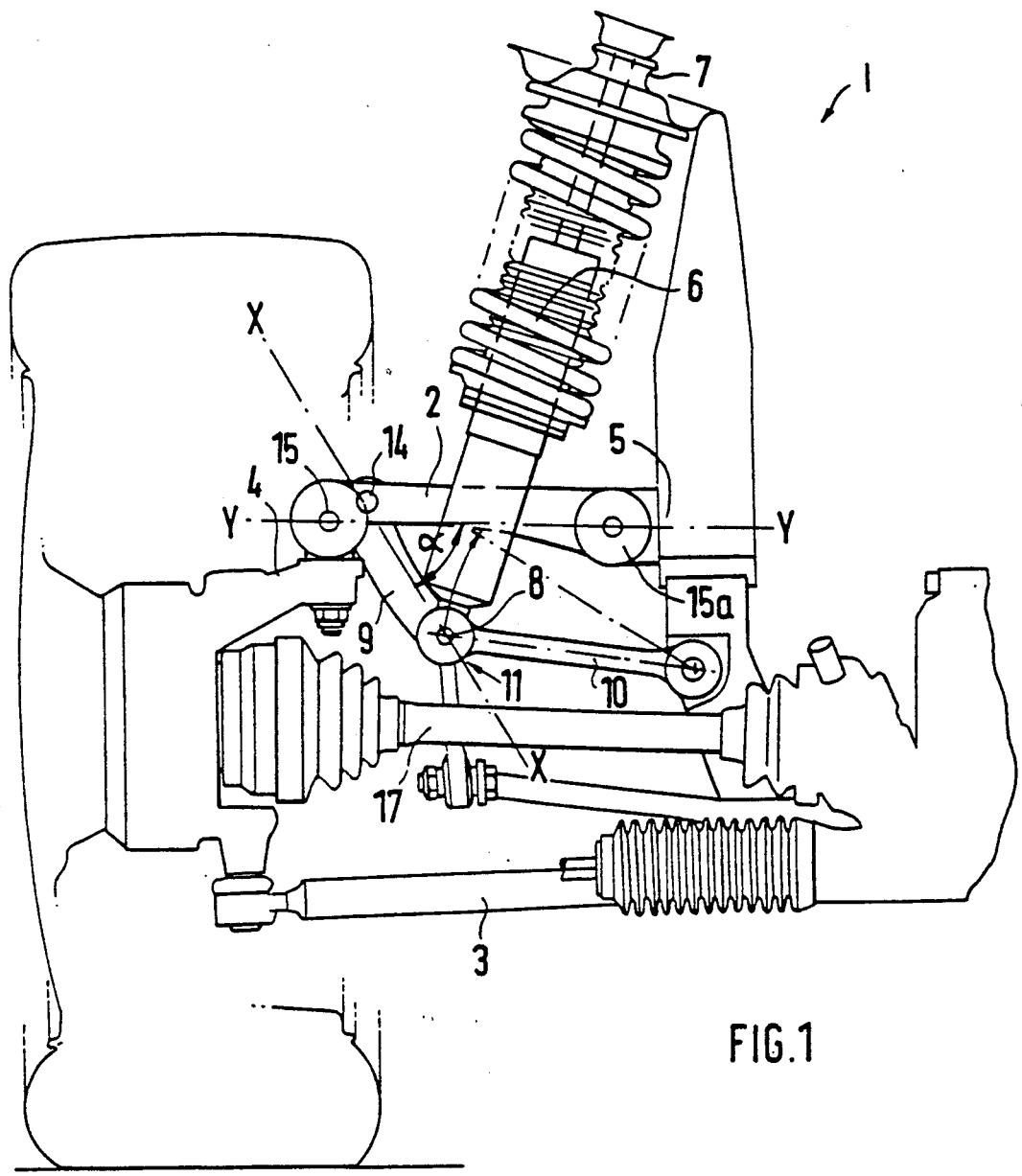
FIG. 1 is a frontal view of a wheel suspension having a bearing lever and a connected control lever.

The front wheel suspension 1 comprises a two armed upper transverse link 2 and a lower transverse link 3 which are pivotally connected to a wheel carrier 4 and which links can be swivelled at the vehicle body 5. Support of the suspension takes place by a spring-and-damper element 6, which is supported in an upper bearing 7 at the vehicle body on one side and in a lower bearing 8 on the other side. The spring-and-damper element 6 is angled laterally outwardly from the top to the bottom and vertically straight in a fore and aft direction of the vehicle.

Figure 2:
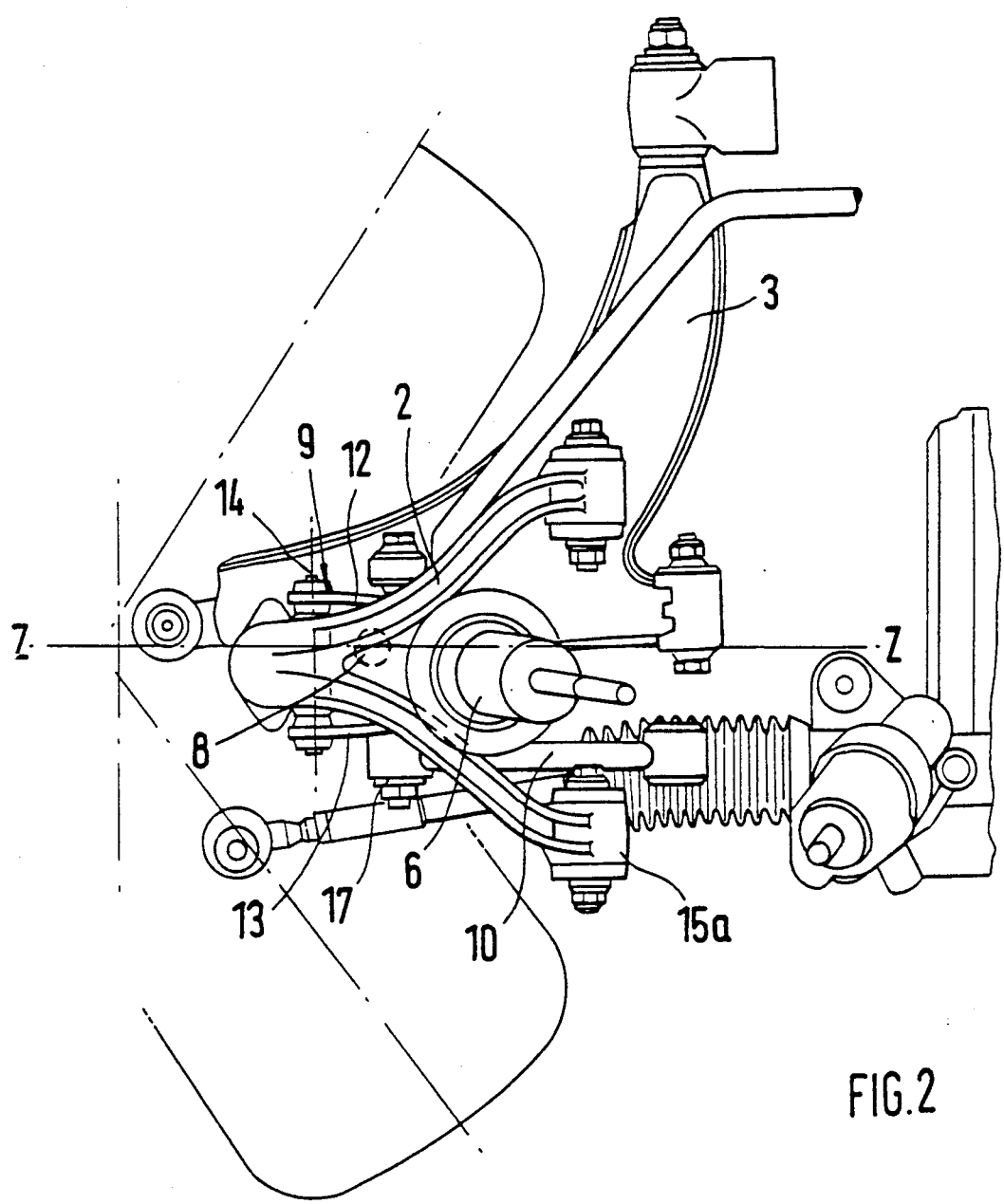
FIG. 2 is a plan view of FIG. 1.
Figure 3:
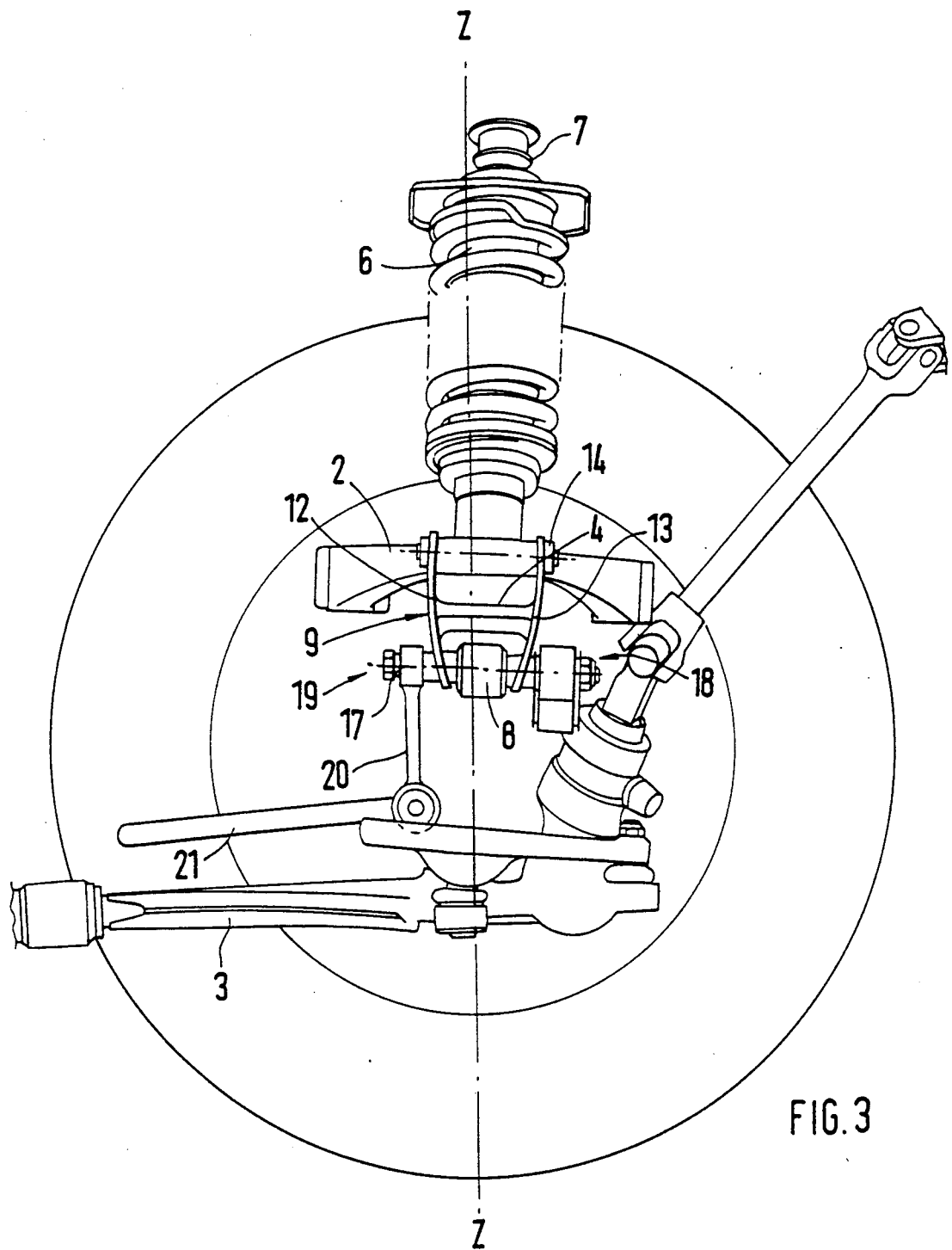
FIG. 3 is a lateral view of FIG. 1.

According to FIGS. 1 to 3, the spring-and-damper element 6 is support at the upper transverse link 2 by a bearing lever 9. Bearing lever 9 is pivotally connected at one end to upper transverse link 2 and is connected with a control lever 10 at its other end. The control lever 10 is pivotally connected to the vehicle body. The lower support bearing 8 for the spring-and-damper element 6 is arranged as the connecting point 11 of levers 9 and 10.

The bearing lever 9 comprises essentially two arms 12 and 13 which accommodate the bearing 8 between them. The two arms 13, 12 are pivotally mounted around a horizontal shaft 14 arranged at the upper transverse link 2. This shaft 14 is arranged directly adjacent to a ball-and-socket joint 15 that connects the transverse link 2 at the wheel carrier 4.

The bearing 8, which forms the lower connecting point 11 of the spring-and-damper unit 6, is located between the two transverse links 2 and 3 and is disposed on an inclined plane X—X extending through the shaft 14 and the bearing 8 which is placed at an acute angle $\alpha$ with respect to an approximately horizontal plane Y—Y extending through the ball and socket joint 15 and the bearing 15a which connects the two armed upper links to the wheel carrier 4 and vehicle body, respectively. The bearing point for bearing 8 is provided approximately in the longitudinal perpendicular wheel center transverse plane Z—Z, as shown in FIG. 2.

Figure 4:
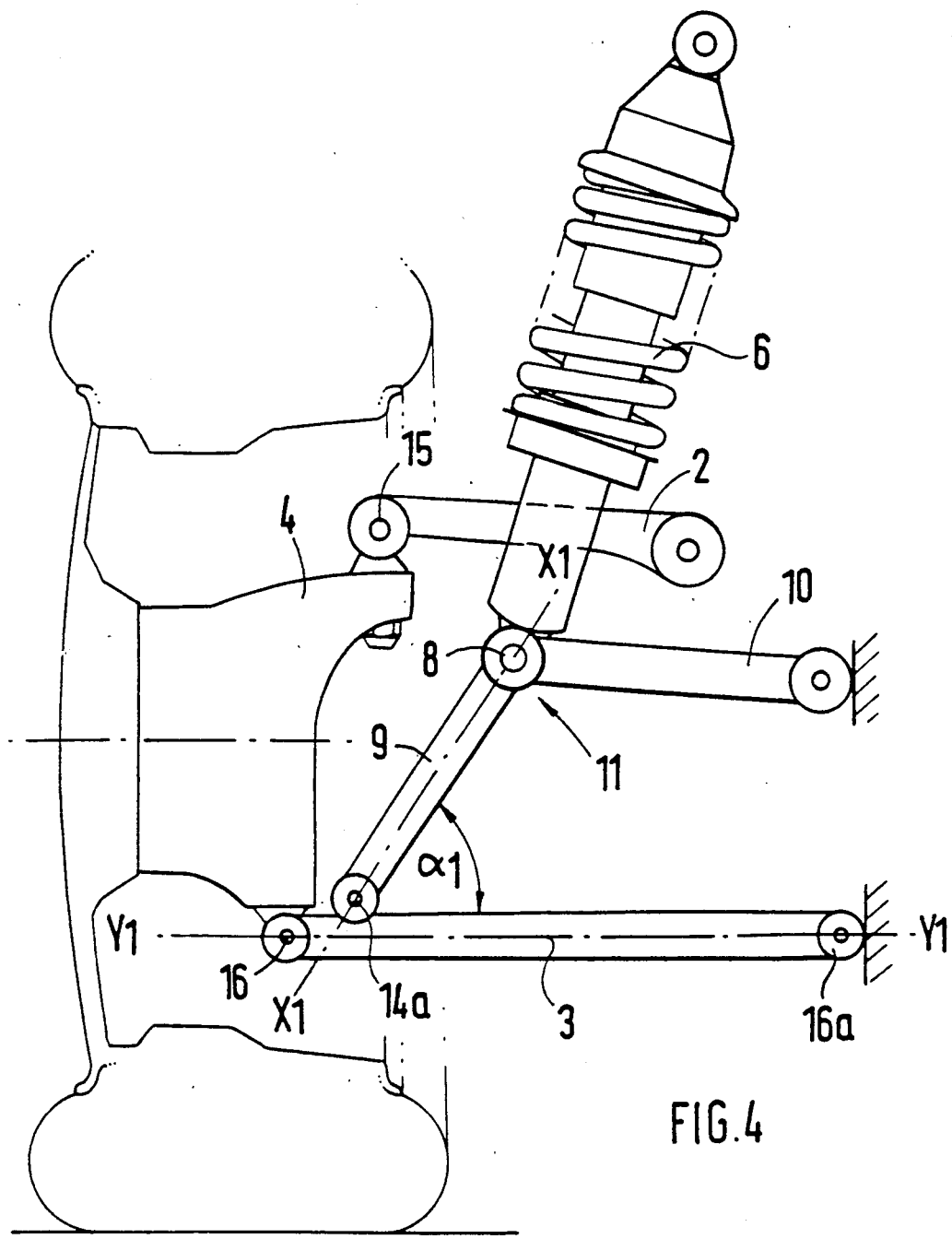
FIG. 4 is another embodiment of a wheel suspension having a bearing lever which is pivotally connected to the lower transverse link.

According to the other embodiment of FIG. 4, the bearing lever 9 is pivotally connected about a horizontal axis 14a, connected to the lower transverse link 3. This axis 14a is situated adjacent to a joint 16 that connects the lower transverse link to the wheel carrier. This lever 9 is also arranged on an inclined plane $X_1$—$X_1$ which extends through bearings 14a and 8, this plane being placed at an acute angle $\alpha 1$ with respect to an approximately horizontal plane $Y_1$—$Y_1$ extending through the bearings 16, 16a.

By means of the formation of the lower connecting point 11 of the damper-and-spring element 6 in the juncture area of the two levers 9 and 10, a desirable arrangement of this point 11 becomes possible by a corresponding selection of the length of the two levers 9 and 10. In addition, the damper transmission ratio can be increased since the compression length of the spring strut is increased with respect to a support of the upper link 2. A direct support at the lower link 3 can be carried out simply only by providing for passage of the wheel drive shaft 7.

The bearing 8 is held on a journal 17 which pivotally carries the control lever 10 at one of its ends 18 and is connected with a suspension gear 20 of a stabilizer 21 at its other end 19 (see FIG. 3).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A wheel suspension for a wheel of a motor vehicle comprising:
   an upper and a lower transverse link each pivotally connected between a wheel carrier for the wheel and a body of the motor vehicle;
   a bearing lever pivotally attached to one of the upper and lower transverse links;
   a spring-and-damper element having an upper end connectable at a position above the upper transverse link to the vehicle body and a lower end supported at a location between the upper and the lower transverse links by a bearing on the bearing lever; and
   a control lever for controlling the bearing lever, said control lever being attachable to the body of the vehicle and to the bearing lever.

2. A wheel suspension according to claim 1, wherein the bearing lever is pivotally connectewd to the one of the upper and lower transverse links at a pivot connection disposed adjacent a pivotal connection of the wheel carrier and the one of the upper and lower transverse links.

3. A wheel suspension according to claim 2, wherein the bearing lever is arranged in an inclined plane which is at an acute angle with respect to a horizontal plane that extends through the one of the upper and lower transverse links.

4. A wheel suspension according to claim 1, wherein the bearing lever is arranged in an inclined plane which is at an acute angle with respect to a horizontal plane that extends through the at one of the upper and lower transverse links.

5. A wheel suspension according to claim 4, wherein the bearing lever includes two arms which are pivotally connected to respective opposite sides of the one of the upper and lower transverse links.

6. A wheel suspension according to claim 5, wherein the two arms support the spring-and-damper unit at the bearing approximately in a longitudinal perpendicular wheel center transverse plane.

7. A wheel suspension according to claim 5, wherein a pin is provided for pivotally attaching the bearing lever to the one of the upper and lower transverse links and for forming the bearing for the spring-and-damper element.

8. A wheel suspension according to claim 7, wherein a suspension gear for a stabilizer is pivotally held on the pin holding the bearing of the bearing level.

9. A wheel suspension according to claim 7, wherein the vehicle wheel is a front vehicle wheel, and wherein the one of the upper and lower transverse links is the upper link.

10. A wheel suspension according to claim 9, wherein a suspension gear for a stabilizer is pivotally held on the pin holding the bearing of the bearing lever.

11. A wheel suspension according to claim 7, wherein the vehicle wheel is a front vehicle wheel, and wherein the one of the upper and lower transverse link is the lower link.

12. A wheel suspension according to claim 11, wherein a suspension gear for a stabilizer is pivotally held on the pin holding the bearing of the bearing lever.

13. A wheel suspension according to claim 12, wherein the upper transverse link includes two link arms which extend laterally from a common connection at the wheel carrier at respective front and rear sides of the spring-and-damper unit to respective pivot connections at the vehicle body.

14. A wheel suspension according to claim 1, wherein the bearing lever includes two arms which are pivotally connected to respective opposite sides of the one of the upper and lower transverse links.

15. A wheel suspension according to claim 14, wherein the two arms support the spring-and-damper unit at the bearing approximately in a longitudinal perpendicular wheel center transverse plane.

16. A wheel suspension according to claim 15, wherein a pin is provided for pivotally attaching the bearing lever to the one of the upper and lower transverse links and for forming the bearing for the spring-and-damper element.

17. A wheel suspension according to claim 16, wherein a suspension gear for a stabilizer is pivotally held on the pin holding the bearing of the bearing lever.

18. A wheel suspension according to claim 1, wherein a pin is provided for pivotally attaching the bearing lever to the one of the upper and lower transverse links and for forming the bearing for the spring-and-damper element.

19. A wheel suspension according to claim 18, wherein a suspension gear for a stabilizer is pivotally held on the pin holding the bearing of the bearing lever.

20. A wheel suspension according to claim 1, wherein the vehicle wheel is a front vehicle wheel, and wherein the one of the upper and lower transverse links is the upper link.

21. A wheel suspension according to claim 1, wherein the vehicle wheel is a front vehicle wheel, and wherein the one of the upper and lower transverse links is the lower link.

* * * * *